US011494600B2

(12) United States Patent
Matsuura et al.

(10) Patent No.: US 11,494,600 B2
(45) Date of Patent: Nov. 8, 2022

(54) PRINTING APPARATUS, SYSTEM AND METHOD SUPPRESSING LOWERING OF CODE ACCURACY AND SYMBOL DISAPPEARANCE

(71) Applicant: BROTHER KOGYO KABUSHIKI KAISHA, Nagoya (JP)

(72) Inventors: Kazunari Matsuura, Komaki (JP); Akidi Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/534,438

(22) Filed: Nov. 23, 2021

(65) Prior Publication Data

US 2022/0164613 A1    May 26, 2022

(30) Foreign Application Priority Data

Nov. 26, 2020    (JP) .............................. JP2020-196051

(51) Int. Cl.
| | |
|---|---|
| *G06K 15/02* | (2006.01) |
| *G06K 15/10* | (2006.01) |
| *B41J 2/045* | (2006.01) |
| *H04N 1/409* | (2006.01) |
| *B41J 3/01* | (2006.01) |

(52) U.S. Cl.
CPC ...... *G06K 15/1872* (2013.01); *B41J 2/04536* (2013.01); *B41J 3/01* (2013.01); *G06K 15/102* (2013.01); *G06K 15/1822* (2013.01); *H04N 1/4092* (2013.01); *B41J 2/04581* (2013.01)

(58) Field of Classification Search
None
See application file for complete search history.

(56) References Cited

U.S. PATENT DOCUMENTS

| | | | | |
|---|---|---|---|---|
| 6,561,610 | B2 * | 5/2003 | Yamasaki | H04N 1/58 |
| | | | | 347/15 |
| 9,162,476 | B2 * | 10/2015 | Shimomura | G06K 15/102 |
| 2008/0180509 | A1 | 7/2008 | Maki | |
| 2015/0091964 | A1 | 4/2015 | Shimomura | |

FOREIGN PATENT DOCUMENTS

| | | | | |
|---|---|---|---|---|
| JP | 2002292848 A | * | 10/2002 | ............ B41J 2/2121 |
| JP | 2005-153157 A | | 6/2005 | |
| JP | 2008-003994 A | | 1/2008 | |
| JP | 2008-183778 A | | 8/2008 | |
| JP | 2011-207136 A | | 10/2011 | |
| JP | 2015-066833 A | | 4/2015 | |

* cited by examiner

*Primary Examiner* — Scott A Rogers
(74) *Attorney, Agent, or Firm* — Kenealy Vaidya LLP

(57) ABSTRACT

A printing apparatus includes: a head which discharges liquid to a medium; and a controller. The controller obtains print data for forming an image on the medium with a dot formed by making the liquid to land on the medium, the image including a code having information; selects, in the obtained print data, dot data corresponding to the dot forming the image as selected data, determines whether a first dot pattern including the selected dot data matches a predetermined delete pattern, and determines whether a second dot pattern including the selected dot data matches a predetermined exclusion pattern; performs a correction of the print data based on results of the determinations; and discharges the liquid from the head to the medium, based on the print data after the correction, to form the image on the medium.

8 Claims, 12 Drawing Sheets

EXAMPLE 1

EXAMPLE 2

EXAMPLE 3

EXAMPLE 4

PRINTING APPARATUS, SYSTEM AND METHOD SUPPRESSING LOWERING OF CODE ACCURACY AND SYMBOL DISAPPEARANCE

CROSS REFERENCE TO RELATED APPLICATIONS

The present application claims priority from Japanese Patent Application No. 2020-196051, filed on Nov. 26, 2020, the disclosure of which is incorporated herein by reference in its entirety.

BACKGROUND

The present disclosure relates to a printing apparatus, a printing system and a printing method.

DESCRIPTION OF THE RELATED ART

Conventionally, there is a known printing system of which purpose is to satisfactorily perform printing of a table and a ruled line which are different from a bar code, without lowering the reading accuracy for the bar code. In this printing system, in a case that print data is data of a bar code, a printer driver performs the printing without performing any correction of thickening a contour line (border line) with respect to the print data; in a case that the print data is not the data of the bar code, the print driver performs the printing while performing a correction of thickening the contour line with respect to the print data.

SUMMARY

As described above, in the above-described printing system, the printing is performed without correcting the print data in the case of printing the bar code. However, in a case that the bar code is printed by discharging a liquid to a paper sheet (paper) and that the liquid bleeds on the paper sheet, a line width of the bar code is increased, thereby lowering the reading accuracy of the bar code. In view of this situation, it is considered to perform a width adjusting process of narrowing or thinning the line with respect to the print data of the bar code. However, in such a case that the line width of a symbol such as a letter (text), etc., which is different from the bar code indicated by the print data is originally thin, there is such a fear that the line of the symbol might disappear due to the width adjusting process. Further, in the case that such a bar code and a symbol are to be printed and that a complex width adjusting process is to be performed therefor, a processing time is required.

In view of the above-described situation, an object of the present disclosure is to provide a printing apparatus, a printing system and a printing method capable of easily suppressing any lowering in the reading accuracy of a code and any disappearance of a symbol.

According to a first aspect of the present disclosure, there is provided a printing apparatus including:
a head configured to discharge liquid to a medium; and
a controller,
wherein the controller is configured to:
obtain print data for forming an image on the medium with a dot which is formed by making the liquid to land on the medium, the image including a code having information;
select, in the obtained print data, dot data corresponding to the dot forming the image as selected dot data, determine whether a first dot pattern including the selected dot data matches a predetermined delete pattern, and determine whether a second dot pattern including the selected dot data matches a predetermined exclusion pattern;
perform a correction of the print data based on results of the determinations; and
discharge the liquid from the head to the medium, based on the print data after the correction, to form the image on the medium.
in the correction, the controller is configured to:
maintain the selected dot data in the print data, in a case of determining that at least the first dot pattern does not match the delete pattern
maintain the selected dot data in the print data, in a case of determining that the first dot pattern matches the delete pattern and the second dot pattern matches the exclusion pattern; and
delete the selected dot data from the print data, in a case of determining that the first dot pattern matches the delete pattern and the second dot pattern does not match the exclusion pattern.

According to a second aspect of the present disclosure, there is provided a printing system including:
a computer; and
a printing apparatus.
wherein the computer has a first controller,
the printing apparatus has a second controller and a head configured to discharge liquid to a medium,
the first controller is configured to.
obtain print data for forming an image on the medium with a dot which is formed by making the liquid to land on the medium, the image including a code having information;
select, in the obtained print data, dot data corresponding to the dot forming the image as selected dot data, determine whether a first dot pattern including the selected dot data matches a predetermined delete pattern, and determine whether a second dot pattern including the selected dot data matches a predetermined exclusion pattern; and
perform a correction of the print data based on results of the determinations,
the second controller is configured to discharge the liquid from the head to the medium based on the corrected print data to form the image on the medium, and
in the correction, the first controller is configured to:
maintain the selected dot data in the print data, in a case of determining that at least the first dot pattern does not match the delete pattern;
maintain the selected dot data in the print data, in a case of determining that the first dot pattern matches the delete pattern and the second dot pattern matches the exclusion pattern; and
delete the selected dot data from the print data, in a case of determining that the first dot pattern matches the delete pattern and the second dot pattern does not match the exclusion pattern.

According to a third aspect of the present disclosure, there is provided a printing method for a printing apparatus including a head configured to discharge liquid to a medium, and a controller, the printing method comprising:
obtaining print data for forming an image on the medium with a dot which is formed by making the liquid to land on the medium, the image including a code having information;

selecting, in the obtained print data, dot data corresponding to the dot forming the image as selected dot data, determining whether a first dot pattern including the selected dot data matches a predetermined delete pattern, and determining whether a second dot pattern including the selected dot data matches a predetermined exclusion pattern; and performing a correction of the print data based on results of the determinations; and discharging the liquid from the head to the medium, based on the corrected print data to form the image on the medium, wherein in the correction:

the selected dot data is maintained in the print data, in a case of determining that at least the first dot pattern does not match the delete pattern;

the selected dot data is maintained in the print data, in a case of determining that the first dot pattern matches the delete pattern and the second dot pattern matches the exclusion pattern; and the selected dot data is deleted from the print data, in a case of determining that the first dot pattern matches the delete pattern and the second dot pattern does not match the exclusion pattern.

The printing apparatus, the printing system and the printing method according to the present disclosure are capable of easily suppressing any lowering in the reading accuracy of the code and any disappearance of the symbol.

BRIEF DESCRIPTION OF THE DRAWINGS

FIG. 9 is a view depicting an example of an exclusion pattern corresponding to a three dot delete pattern.

FIG. 10 is a view depicting an example of an exclusion pattern corresponding to a four dot delete pattern.

DETAILED DESCRIPTION

Configuration of Printing Apparatus

Figure 1:
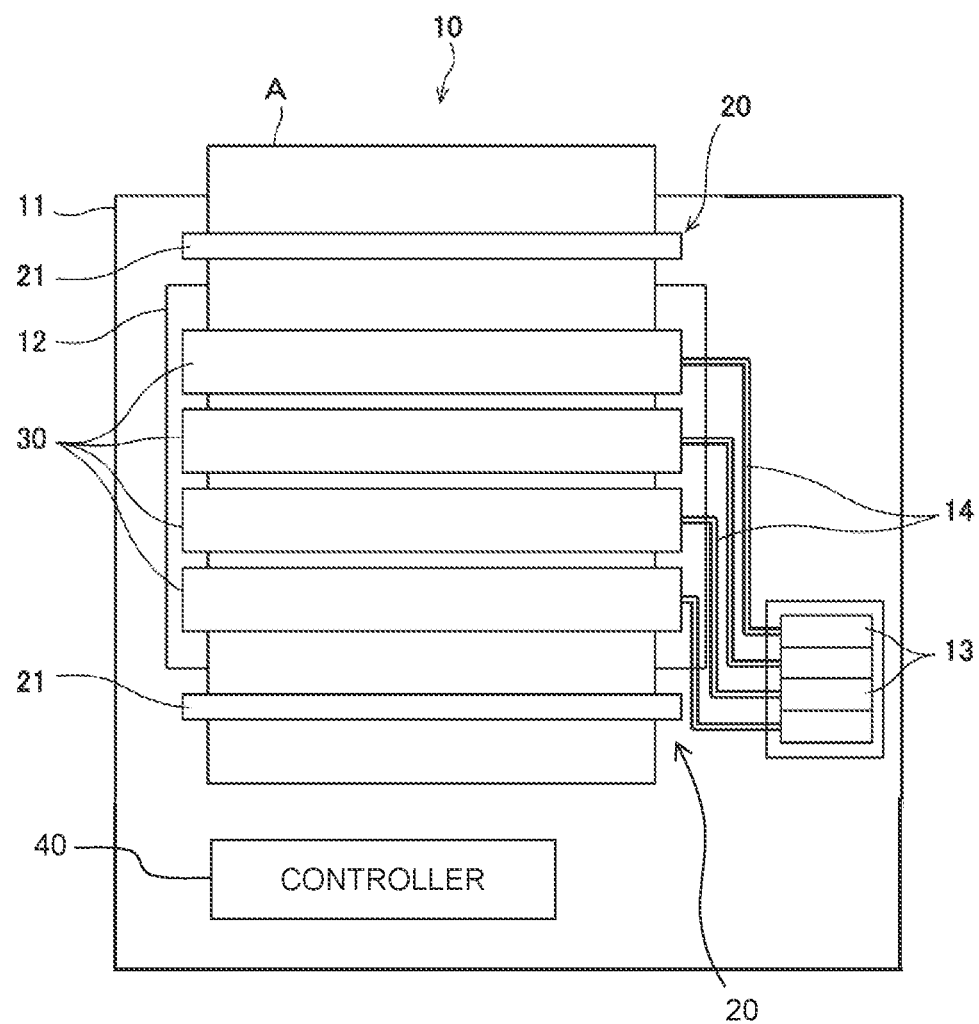
FIG. 1 is a schematic view of a printing apparatus according to an embodiment of the present disclosure, as seen from thereabove.

A printing apparatus 10 according to an embodiment of the present disclosure is, for example, an ink-jet printer which discharges a liquid such as an ink, etc., to a medium A which is a paper sheet, as depicted in FIG. 1. The printing apparatus 10 is provided with a casing 11, a platen 12, a conveyor 20, one piece or a plurality of pieces (for example, four pieces) of a head 30, a tank 13 and a controller 40. Note that the details of the controller 40 will be described later on.

Further, a conveying direction in which the medium A is conveyed by the conveyor 20 is defined as a "front-rear diction", and a crossing direction crossing (for example, orthogonal to) the conveying direction is referred to as a "left-right direction". Furthermore, a direction crossing (for example, orthogonal to) the front-rear direction and the left-right direction is referred to as an "up-down direction". The direction of arranging the printing apparatus 10, however, is not limited to or restricted by this.

The casing 11 accommodates the platen 12, the conveyor 20, the head(s) 30, the tank 13 and the controller 40. The platen 12 has a flat upper surface, and the medium A is placed on this upper surface.

Figure 3:
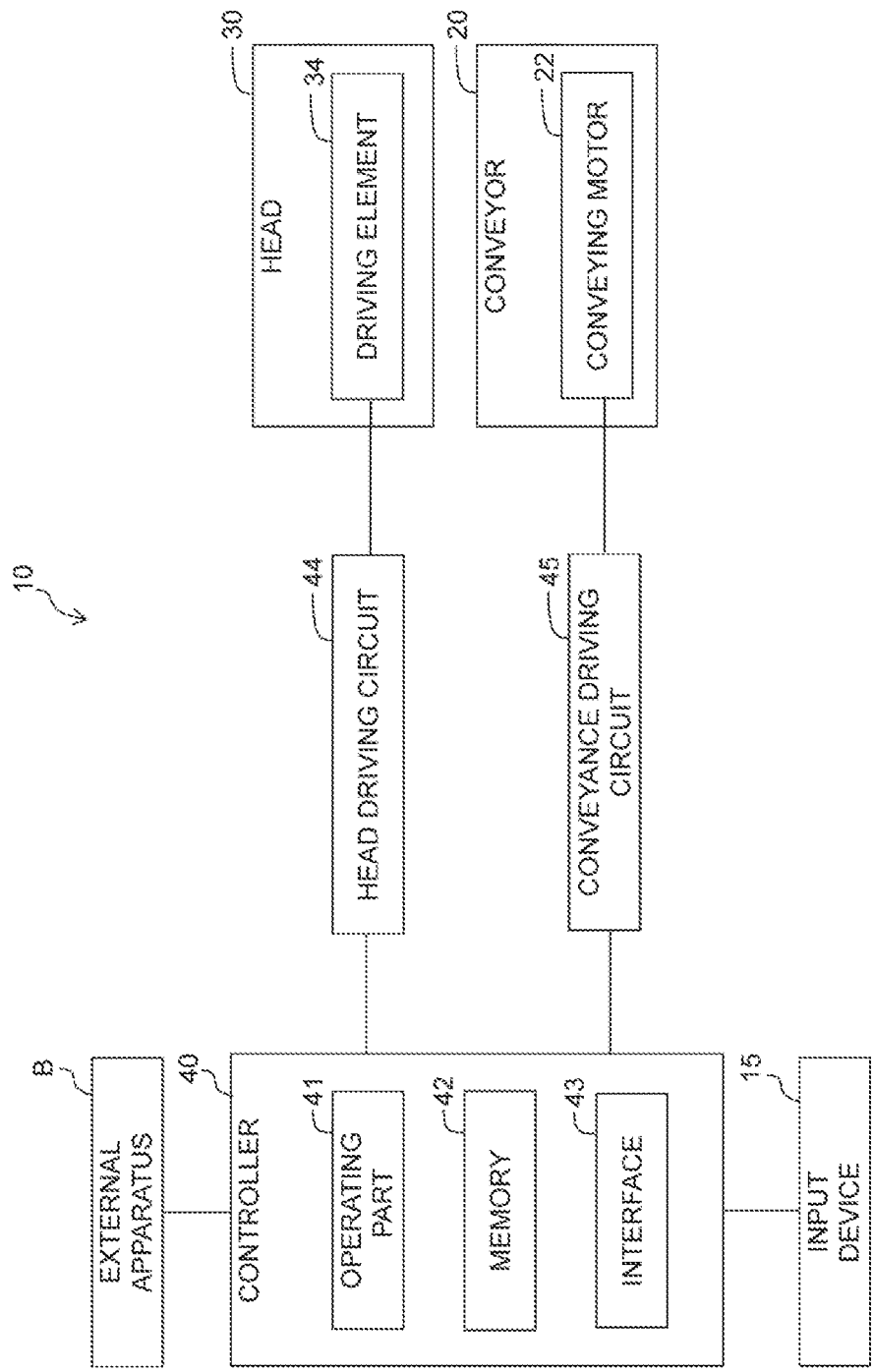
FIG. 3 is a functional block diagram depicting an example of the printing apparatus of FIG. 1.

The conveyor 20 has a pair of conveying rollers 21 and a conveying motor 22 (FIG. 3). The pair of conveying rollers 21 are arranged so as to sandwich the heads 30 therebetween in the front-rear direction; the central shafts of the pair of conveying rollers 20 extend in the left-right direction, and are arranged parallel to each other. The conveying motor 22 is connected to and rotate the pair of conveying rollers 21, thereby conveying the medium A frontward.

Each of the heads 30 is fixed to the casing 11, has a rectangular shape, and a size in the left-right direction greater than that of the medium A. The lower surfaces of the heads 30 face or are opposite to the upper surface of the platen 12, and the lower surfaces of the heads 30 are arranged parallel to one another. Four pieces of the head 30 are aligned in a row in the front-rear direction. Note that the detail of each of the four heads 30 will be described later on.

The tank 13 is provided, for example, as tanks 13 of which number is same as that of the head 30; the tanks 13 store mutually different kinds of liquids, respectively, and each of the tanks 13 is connected to the head 30 via a tube 14. For example, four pieces of the tank 13 store liquids of cyan, magenta, yellow and black colors, respectively, and each of the tanks 13 supplies one of the liquids of the cyan, magenta, yellow and black colors to a head 30, among the four heads 30, corresponding thereto.

<Configuration of Head>

Figure 2:
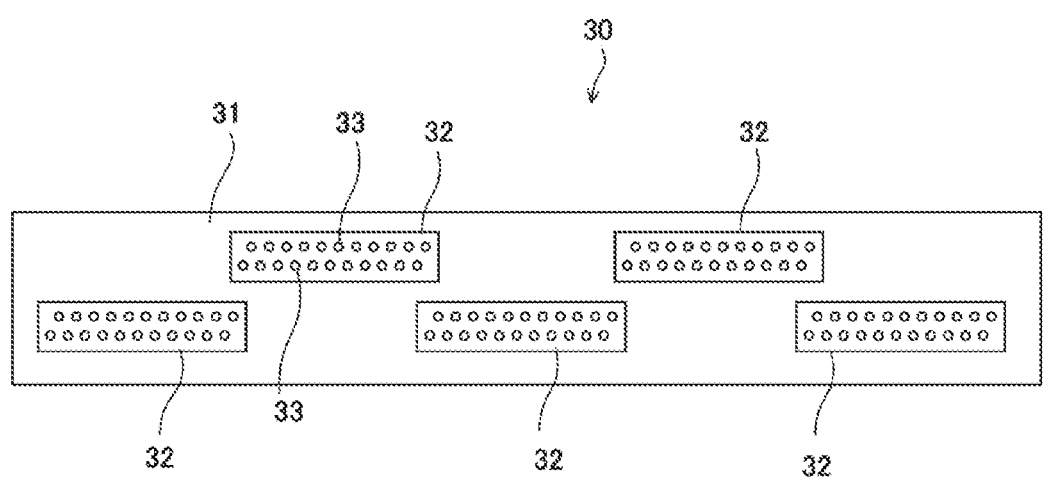
FIG. 2 is a schematic view of a head in FIG. 1, as seen from therebelow.
Figure 2:
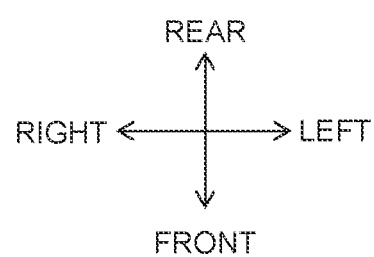

As depicted in FIG. 2, the head 30 has a holding stand 31 and a plurality of chips 32. The holding stand 31 has, for example, a rectangular parallelepiped shape, and holds the plurality of chips 32 so that lower surfaces of the plurality of chips 32 are exposed in the lower surface of the holding stand 31. Note that in FIG. 2, only one piece of the four heads 30 is depicted.

Each of the plurality of chips 32 has a plurality of nozzles 33 and a plurality of driving elements 34 (FIG. 3) each corresponding to one of the plurality of nozzles 33. Each of the plurality of nozzles 33 is connected to the tank 13 via a liquid channel and the tube 14. For example, the plurality of nozzles 33 are aligned at a predetermined spacing distance therebetween in the left-right direction, thereby forming a nozzle row (nozzle array). In each of the plurality of chips 32, a plurality of pieces of the nozzle row are arranged side by side in the front-rear direction so that the plurality of nozzles 33 are arranged side by side at an equal spacing distance therebetween in the left-right direction.

The plurality of chips 32 are arranged side by side along the left-right direction in each of the four heads 30 so that chips 32 which are included in the plurality of chips 32 and which are adjacent to each other are arranged to be shifted from each other in the front-rear direction. Accordingly, the plurality of chips 32 are arranged side by side in the left-right direction so that every other chips 32, among the plurality of chips 32, are staggered from each other in the front-rear direction. The plurality of chips 32 are arranged so that that the plurality of nozzles 33 extend longer in the left-right direction than the medium A, with the equal spacing distance therebetween.

<Configuration of Controller>

The controller 40 has an operating part 41, a memory 42 and an interface 43, as depicted in FIG. 3. Note that the controller 40 may be a single controller which singly performs the control, or a plurality of controllers which perform the control in a decentralized manner.

The interface 43 is connected to an external apparatus B such as a computer, a network, a storage medium, etc., and receives a variety of kids of data such as print data, etc., from the external apparatus B. The print data is data for forming an image including a code having information on the medium A, by a dot formed by making a liquid to land on the medium A; the print data includes, for example, image data such as raster data, etc. The print data includes a gradation indicating the density per a unit area in the image. Note that the print data may be data stored in the memory 42. Further, the print data may be data of which numerical notation is not less than 2 (two) (binary or more data) indicating whether or not the liquid is to be discharged from the head 30. Further, the print data may be RGB value data before being converted to the binary or more data.

The memory 42 is a storage medium to which the operating part 41 is accessible, and is constructed, for example, of a RAM and a ROM. The RAM temporarily stores a variety kinds of data. The variety of kinds of data are exemplified by as print data, and data converted by the operating part 41. The ROM stores a program for performing a variety of kinds of process. Note that the program may be stored in a storage medium different from the memory 42. Further, the program may be stored in a single storage medium or a plurality of storage media.

The operating part 41 is constructed of a processor such as a CPU, etc., and an integrated circuit such as an ASIC, etc. The operating part 41 executes the program stored in the ROM so as to control the plurality of driving elements 34 and the conveying motor 22, thereby executing a variety of kinds of process. The variety of kinds of process are exemplified, for example, by an obtaining process, a determining process, a correcting process and a printing process, and the details of these process will be described later on.

The controller 40 is connected to the plurality of driving elements 34 via a head driving circuit 44, and outputs a control signal based on the print data to the head driving circuit 44. The head driving circuit 44 generates a driving signal based on the control signal, and outputs the driving signal to each of the plurality of driving elements 34. With this, each of the plurality of driving elements 34 is driven based on the driving signal, and applies pressure to the liquid in a channel connected to one of the plurality of nozzles 33 corresponding thereto, thereby discharging the liquid from one of the plurality of nozzles 33.

Further, the controller 40 is connected to the conveying motor 22 via a conveyance driving circuit 45, and outputs a control signal based on the print data to the conveyance driving circuit 45. The conveyance driving circuit 45 generates a driving signal based on the control signal, and outputs the driving signal to the conveying motor 22. With this, the driving timing, the rotation speed, the rotation amount, etc., of the conveying motor 22 is controlled, thereby conveying the medium A frontward.

<Printing Process>

The controller 40 performs a printing process of printing an image on the medium A based on the print data. In the printing process, the controller 40 performs a discharging operation of discharging the liquid from the nozzles 33 by the driving of the driving elements 34, and a conveying operation of conveying the medium A frontward by the driving of the conveying motor 22. With this, the liquid(s) discharged from the nozzles 33 lands on the medium A, thereby forming dots, with the liquid(s), on the medium A. The dots are arranged side by side in the left-right direction along the nozzle rows extending in the left-right direction, and are arranged side by side in the front-rear direction along the conveying direction of the medium A, thereby printing the image on the medium A.

The image is formed of one piece or a plurality of pieces of dot and includes, for example, an information code C and a symbol D. The symbol D is an image which is different from the information code C, and is exemplified by a letter and a mark. The information code C is a code for reading information from a reflected light, and is exemplified, for example, by a one-dimensional code such as a bar code, and a two-dimensional code such as a QR (trade name) code, etc. The information code C is irradiated with a light such as an infrared light by a code reader for the information code C, and the information included in the information code C is read from a reflected light reflected off from the information code C.

Figure 4A:
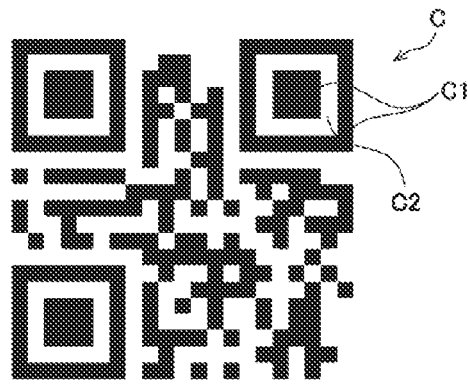
FIG. 4A is a view depicting an information code.

As depicted in FIG. 4A, the information code C has a first part C1 and a second part C2. The first part C1 is a part formed of dots of a color of which light absorption rate is high, such as the black color (namely, a color of which light reflectance rate is low), in an image representing the information code C.

The second part C2 is a part formed (defined) by a space provided between first parts C1 which are adjacent. The second part C2 has a color of which light reflectance rate is high, such as the white color, etc., than the first part C1 (namely, a color of which light absorption rate is low). In the present embodiment, the second part C2 is a blank part in which the liquid is not discharged from the nozzle(s) 33, and is constructed, for example, of the medium A of which color is white.

<Determining Process>

Figure 4B:
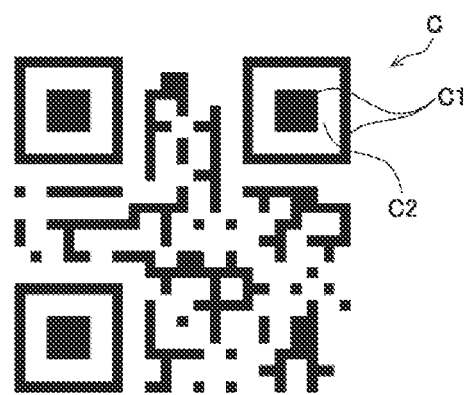
FIG. 4B is a view depicting the information code in which dots are deleted form the contour (contour line) of FIG. 4A.
Figure 4C:
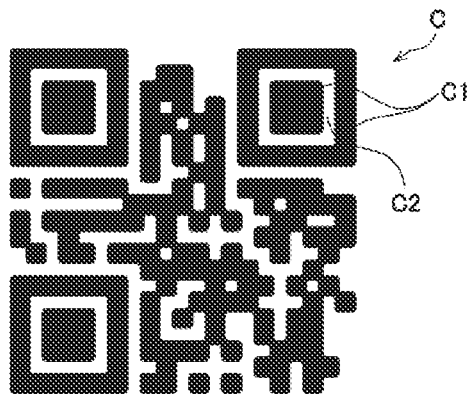
FIG. 4C is a view depicting the information code of FIG. 4A as printed on a medium in which a liquid easily bleeds.
Figure 4C:
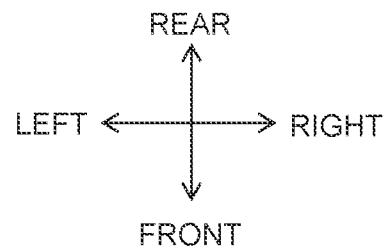
Figure 5A:
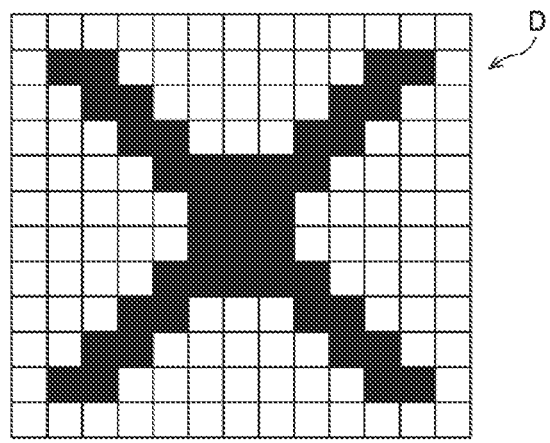
FIG. 5A is a view depicting a symbol.
Figure 5B:
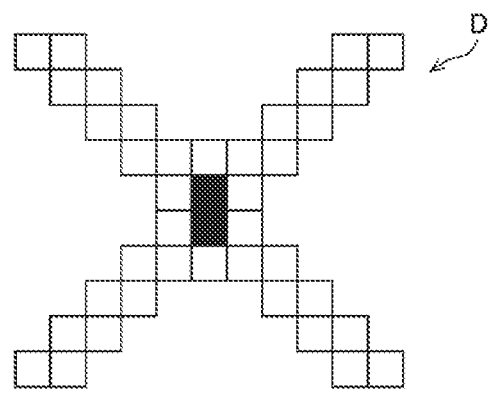
FIG. 5B is a view depicting the symbol in which dots are deleted from the contour of FIG. 5A.

As described above, in the printing process, the printing apparatus 10 discharges the liquid(s) onto the medium A so as to record an image on the medium A. For example, in a case that the information code C of FIG. 4A is printed and that the liquid bleeds on the medium A, the line width of the image is increased as depicted in FIG. 4C, which in turn leads to any lowering of the reading accuracy of the information code C. On the other hand, there is a case that the line width of the symbol D is thin, as depicted in FIG. 5A. In this case, if the line width on the print data is made to be narrow (thin) as depicted in FIG. 5B, there is such a fear that the thin line might be deleted (not printed), and that the mark D might disappear. In view of this, the controller 40 executes a determining process in order to easily suppress any lowering in the reading accuracy of the code and any disappearance of the symbol D.

In the determining process, the controller 40 selects, in the print data, dot data corresponding to a dot forming the image, and determines whether or not a dot pattern F in a predetermined range including the selected dot data (hereinafter referred to as "selected dot data E") matches a predetermined delete pattern, and whether or not a dot pattern G in a predetermined range including the selected dot data E matches a predetermined exclusion pattern. Note that each of the dot patterns F and G may be set in a same range, or in mutually different ranges. In the present embodiment, for the convenience of explanation, an example in which the dot patterns F and G are set in the same range will be explained.

Figure 5C:
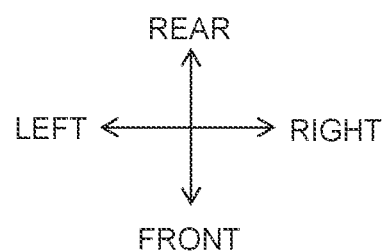
FIG. 5C is a view of the symbol of FIG. 5A as converted into data (digitized).

For example, as depicted in FIG. 5C, the controller 40 divides, based on the print data, an image to be printed into a plurality of cells in a grid-like manner so that one dot corresponds to one cell. The controller 40 sets dot data "1" (one) to a cell of which density is not less than a predetermined value, as forming a dot. The controller 40 sets blank data "0" (zero) to a cell of which density is less than the predetermined value, as not forming any dot. Further, the controller 40 selects the dot data "1" sequentially from the plurality of cells in the print data, and extracts the dot pattern F and the dot pattern G each of which is in the predetermined range including the selected dot data E. For example, as depicted in a shading in FIG. 5C, the controller 40 sets, as the predetermined range, a total of 25 (twenty five) cells in five columns in the front-rear direction and five rows in the left-right direction, with the selected dot data E as the center thereof. Then, the controller 40 sets a pattern formed by cells (dots) in this range as each of a dot pattern F and a dot pattern G with respect to the selected dot data E.

The delete pattern includes a dot pattern for extracting dot data corresponding to a dot constructing a contour (contour line) of the image, and is stored in the memory 42. For example, the delete pattern includes a N dot delete pattern for extracting, with respect to the image in which a plurality of pieces of the dot are continuously arranged side by side in a predetermined direction, dot data corresponding to N piece (N being an integer of not less than 1) of the dot which is to be deleted from the contour of the image.

Figure 6:
FIG. 6 is a view depicting an example of a two dot delete pattern.

Examples 1 to 8 of FIG. 6 are examples of the two dot delete pattern. In each of these delete patterns, among 8 (eight) cells surrounding a central dot data "1", one cell is the blank data "0" and the other (remaining) cells are non-referenced data "–1". The non-referenced data "–1" is data not used in the determining process.

In this case, a dot by the central dot data and a blank by blank data are adjacent to each other in the image. Accordingly, there is such a possibility that the dot by the central dot data might be located at an end of the image, and might construct the contour of the image. Therefore, the controller 40 compares the dot pattern F including the selected dot data E and the data of the eight cells surrounding the selected dot data E as depicted in FIG. 5C with the delete patterns as indicated in Examples 1 to 8 of FIG. 6. Note that the comparison is made such that the selected data E and the central dot data in the delete pattern overlap with each other. Based on a result of the comparison, the controller 40 determines that the dot pattern F matches the delete patterns of Examples 1 to 3 and 6 in FIG. 6.

In such a manner, the controller 40 makes the comparison with respect to the image with the delete patterns for each dot pattern F. As the result, in a case that there is at least one blank cell data "0" in the surrounding of the selected dot data E in the dot pattern F, the controller 40 determines that the dot pattern matches the delete pattern. On the other hand, in a case that there is not one blank cell data "0" in the surrounding of the selected dot data E in the dot pattern F, the controller 40 determines that the dot pattern does not match the delete pattern.

With this, dot data corresponding to 2 dots are extracted so as to delete one dot from each of an upper end and a lower end in the up-down direction from the contour of the image. Further, dot data corresponding to 2 dots are extracted so as to delete one dot from each of a left end and a right end in the left-right direction from the contour of the image.

The exclusion pattern includes a dot pattern for extracting the dot data by which dot data corresponding to dots constructing a line is to be deleted by not less than a predetermined ratio in a case that the dot data which matches the delete pattern and which is included in the dot data corresponding to the dots constructing the line is deleted from the print data. The predetermined ratio is a ratio by which a thin line (fine line) becomes unreadable, and is, for example, 80%. Note that the predetermined ratio may be set, for example, at a time of designing the printing apparatus 10, etc.

For example, in the example of FIG. 5A, each of lines which are different form the central part and which extend obliquely (each of four lines) is constructed of 7 (seven) dots. These seven dots correspond to the dots constructing the line. In this case, the controller 40 deletes, from the print data, the dot data matching the delete pattern. With this, as depicted in FIG. 5B, the dot data corresponding to the dots constructing the line (line dot data) is deleted. With this, since all the seven dots are deleted, 100% of the line dot data is deleted. The deleted ratio is not less than the predetermined ratio, and thus the deletion is performed to such an extent that the symbol D is unrecognizable. The exclusion pattern for avoiding such a deletion is stored in the memory 42. A plurality of pieces of the exclusion pattern are provided corresponding to the N dot delete pattern.

Figure 7:
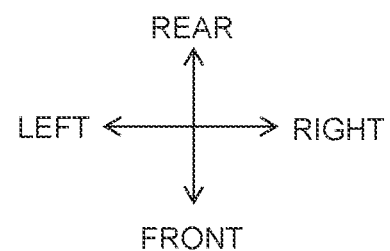
FIG. 7 is a view depicting an example of an exclusion pattern corresponding to the two dot delete pattern.

For example, with respect to the two dot delete pattern, four pieces of the exclusion pattern are provided, as indicated by Examples 1 to 4 of FIG. 7. In the exclusion pattern of Example 1 of FIG. 7, the central dot data is sandwiched by two pieces of blank data in the up-down direction. The exclusion pattern of Example 3 of FIG. 7 includes the central dot data and dot data which is adjacent to and located below the central dot data, and further these two pieces of the dot data are sandwiched by two pieces of blank data in the up-down direction. The exclusion patterns of Examples 1 and 3, respectively, are intended to avoid such a situation that a thin (fine) line extending in the left-right direction is made to be too thin (fine) to be visually recognizable or is allowed to disappear.

Namely, in a case that the dot pattern matches the exclusion pattern of Example 1 of FIG. 7, there is such a possibility that a thin line in which one piece of dot is aligned in the left-right direction is defined as the print data. Alternatively, in a case that the dot pattern matches the exclusion pattern of Example 3 of FIG. 7, there is such a possibility that a thin line in which two pieces of dot which are adjacent to each other in the up-down direction are aligned in the left-right direction is defined as the print data. In view of this, the controller 40 excludes the selected dot data E corresponding to these dot patterns from the object of deletion, as each of these dot patterns matching Example 1 or Example 3 of FIG. 7. By doing so, the dot(s) corresponding to the selected dot data E is (are) not deleted, thereby making setting so as not to allow a line extending in the left-right direction and defined by the dot(s) to disappear. Further, the exclusion patterns of Examples 2 and 4 of FIG. 7, respectively, are intended to avoid such a situation that a thin (fine) line extending in the up-down direction is made to be too thin (fine) to be visually recognizable or is allowed to disappear, and the principle thereof is same as that of Examples 1 and 3 of FIG. 7. Namely, the controller 40 applies the exclusion pattern of Example 3 or Example 4 of FIG. 7 to thereby make setting so that the dots arranged side by in the up-down direction are not deleted, and that a thin line which is constructed of these dots and which extends in the up-down direction is not allowed to disappear.

Further, the exclusion pattern corresponding to the N dot delete pattern includes a dot pattern for extracting not more than N dots are continuously arranged in a predetermined direction. As indicated by Examples 1 to 4 of FIG. 7, in the exclusion pattern corresponding to the two dot delete pattern, the dot data of not more than 2 dots continuously arranged in each of the up-down direction and the left-right direction is set. In such a manner, the exclusion pattern is set so that all the dots constructing the line are not deleted, and that the line is not allowed to disappear.

<Correcting Process>

The controller 40 executes a correcting process of correcting the print data based on the result of the determining process. In the correcting process, the controller 40 does not make a correction of deleting, from the print data, the selected dot data E regarding which the determination has been made as not matching at least the delete pattern. Further, the controller 40 does not make the correction of deleting, from the print data, the selected dot data E regarding which the determination has been made as matching the delete pattern and regarding which the determination has been made as matching the exclusion pattern. Furthermore, the controller 40 makes the correction of deleting, from the print data, the selected dot data E regarding which the determination has been made as matching the delete pattern and regarding which the determination has been made as not matching the exclusion pattern.

In this correction, the controller 40 replaces the "1" of the selected dot data E regarding which the determination has been made as not matching the exclusion pattern and regarding which the determination has been made as matching the delete pattern with the blank data "0". With this, the selected dot data E is deleted from the print data. Accordingly, in the image, the dot is not formed at a position corresponding to the selected dot data E. and the dot constructing the contour of the image is deleted.

Further, in a case that the controller 40 is set to use the N dot delete pattern as the delete pattern at a time of making the determination as to whether or not the dot pattern F in the predetermined range including the selected dot data E matches the delete pattern and making the determination as to whether or not the dot pattern G in the predetermined range including the selected dot data E matches the exclusion pattern, the controller 40 is configured to correct, at a time of making the correction of deleting the selected dot data E from the print data, the print data so as to delete less than the N piece of the dot from the contour of the image with respect to at least a part of the image.

For example, the controller 40 determines, in the determining process, that the dot pattern F, including dot data of a dot at the left end and dot data of a dot at the right end among the dots which are continuously aligned in the left-right direction, matches the two dot delete pattern. Here, for example, the controller 40 determines, in the determining process, that the dot pattern G of the dot at the left end matches the exclusion pattern corresponding to the two dot delete pattern, and that the dot pattern G of the dot at the right end does not match the exclusion pattern corresponding to the two dot delete pattern. In such a case, in the correcting process, the controller 40 does not delete the dot data of the dot on the left end from the print data, whereas the controller 40 deletes the dot data of the dot at the right end from the print data. Accordingly, in the left-right direction, one dot is not deleted from the left end of the contour of the image, whereas the one dot is deleted from the right end of the contour of the image.

Alternatively, the controller 40 determines, in the determining process, that the dot pattern G of the dot at the left end and the dot pattern G of the dot at the right end match the exclusion pattern. In this case, in the correcting process, the controller 40 does not delete the dot data of the dot on the left end and the dot data of the dot at the right end from the print data, and thus 0 (zero) piece of the dot is deleted from the contour of the image in the left-right direction. In such a manner, there is such a case that one piece of the dot or 0 (zero) piece of the dot is deleted in the image, in the case of using the two dot delete pattern in the determining process.

<Printing Method>

Figure 8:
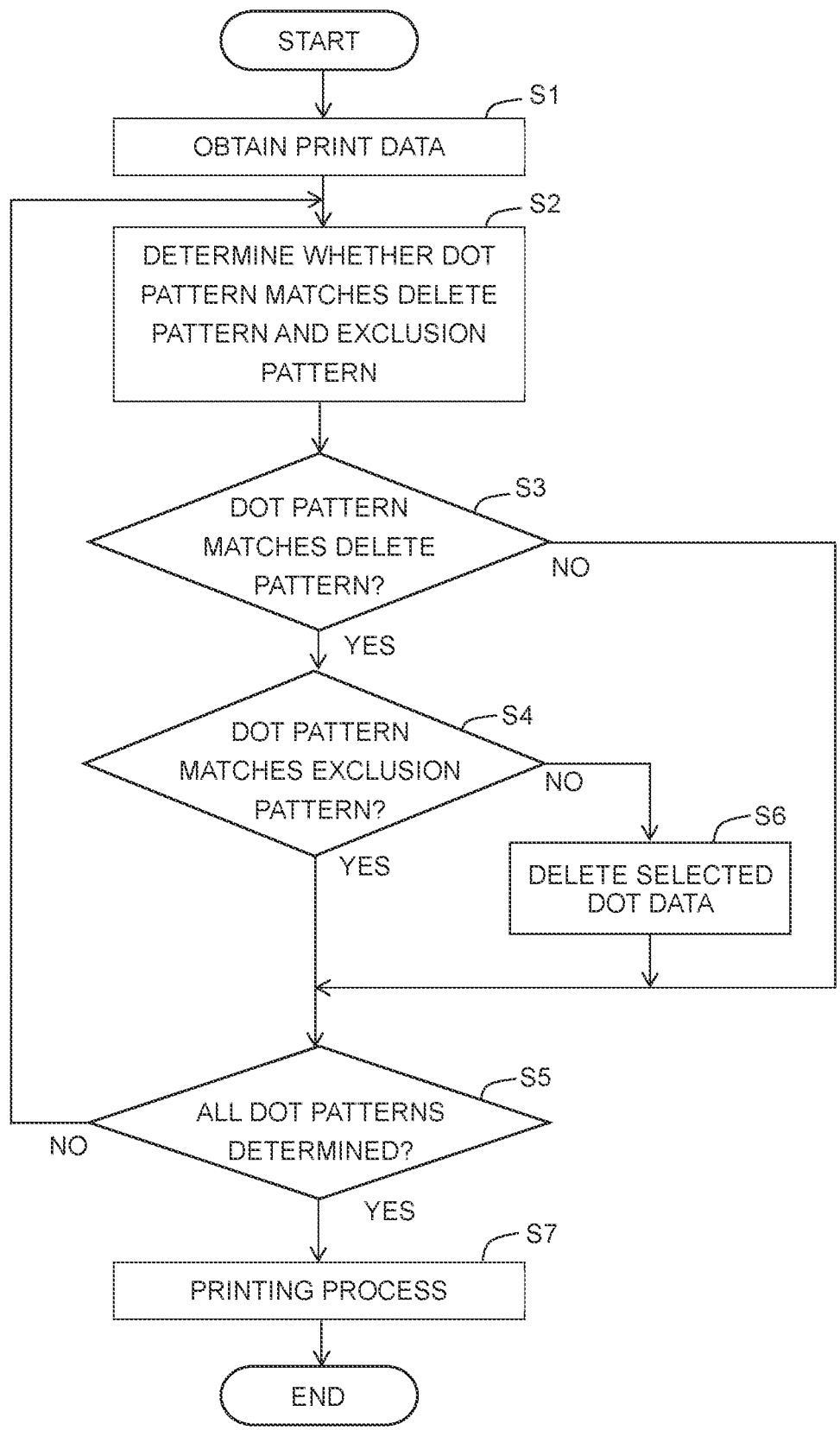
FIG. 8 is a flow chart indicating an example of a printing method of FIG. 1.

A printing method by such a printing apparatus 10 is executed, for example, along the flow chart of FIG. 8 by the controller 40. The controller 40 executes an obtaining process of obtaining the print data from the external apparatus B, etc. (step S1).

Further, for example, the controller 40 divides, based on the print data, an image as an object of the printing into a plurality of cells as depicted in FIG. 5A, and obtains the density for each of the plurality of cells. The controller 40 sets the dot data "1" to a cell of which density is not less than a predetermined value, and sets the blank data "0" to a cell of which density is less than the predetermined value, as depicted in FIG. 5C. The controller 40 selects the dot data from each of the plurality of cells, and obtains the dot pattern F and the dot pattern G of the cells in the predetermined range including the selected dot data E.

The controller 40 executes the determining process of determining whether or not the dot pattern F matches the delete pattern and whether or not the dot pattern G matches the exclusion pattern (step S2). For example, the controller 40 compares the dot pattern F of FIG. 5C with the delete patterns of Examples 1 to 8 of FIG. 6. As a result of the comparison, this dot pattern F matches the dot patterns of Examples 1 to 3 and Example 6 of FIG. 6 (step S3: YES).

Further, the controller 40 compares the dot pattern G of FIG. 5C with the exclusion patterns of Examples 1 to 4 of FIG. 7. As a result of the comparison, this dot pattern G matches the exclusion patterns of Examples 3 and 4 of FIG. 7 (step S4: YES). In such a manner, the controller 40 does not make the correction of deleting, from the print data, the selected dot data E in a case of determining that the dot pattern F matches the delete pattern and the dot pattern G matches the exclusion pattern.

Further, in a case that the determining process is not executed with respect to all the dot patterns F and all the dot pattern G in the print data (step S5: NO), the controller 40 returns to step S2 and repeats the process. Here, the controller 40 does not make the correction of deleting the selected dot data E from the print data, in a case of determining that the dot pattern F does not match the delete pattern (step S3: NO).

On the other hand, in a case that the controller 40 determines that the dot pattern F matches the delete pattern and that the dot pattern G does not match the exclusion pattern (step S3: YES, step S4: NO), the controller 40 executes the correction of deleting the selected data E from the print data (step S6). For example, in the information code C of FIG. 4A, the dot pattern F of the dots constructing the contour of the first part C1 matches the delete pattern. On the other hand, the line of the information code C is thick and not less than 3 (three) pieces of the dot constructing the line in each of the front-rear direction and the left-right direction are aligned continuously, and this dot pattern G does not match the exclusion pattern.

In view of this, the controller 40 deletes, from the print data of the information code C of FIG. 4A, the dot data of a dot arranged at the front end and the dot data of a dot arranged at the rear end among the plurality of dots continuously aligned in the front-rear direction. Further, the controller 40 deletes, from the print data of the information code C of FIG. 4A, the dot data of a dot arranged at the left end and the dot data of a dot arranged at the right end among the plurality of dots continuously aligned in the left-right direction. By doing so, the dots constructing the contour of the first part C1 are deleted from the front-rear direction and the left-right direction, as depicted in FIG. 4B.

Furthermore, in a case that the controller 40 has performed the determining process with respect all of the dot patterns F and G in the print data (step S5: YES), the controller 40 performs the printing process (step S7). Note that the controller 40 may execute the printing process every time the controller 40 executes the determining process with respect to the dot pattern F and the dot pattern G of the dot data in all the cells aligned in the left-right direction.

In the printing process, the controller 40 discharges, based on the corrected print data, the liquid(s) form the heads 30 onto the medium A to thereby form the image on the medium A. Here, the controller 40 drives the piezoelectric element 34 with respect to the dot data "1" of the print data. With this, the liquid is discharged from the nozzle 33 and lands on the medium A, thereby forming a dot of the liquid on the medium A. The first part C1 and the symbol D of the information code are formed on the recording medium A by the dots.

Further, the controller 40 does not drive the driving element 34 with respect to the blank data "0" of the print data. With this, since any dot is not formed at a position, of the medium A, which corresponds to the blank data, a part of the medium A appears. The appeared part of the medium A constructs, for example, the second part C2 of the information code C. In such a manner, the information code C is formed by the second part C2 formed by the appeared part of the medium A and the first part C1 formed by the dots.

For example, even in a case that the liquid easily bleeds on the recoding medium A, the dots regarding which the determination of as being matching the delete pattern has been made are deleted, as depicted in FIG. 4B, so as to decrease the increase in the line width of the information code C as depicted in FIG. 4A, thereby making it possible to suppress any lowering in the reading accuracy of the information code C. Further, by not deleting the dot(s) regarding which the determination of as being matching the exclusion pattern has been made, as depicted in FIG. 5A, it is possible to suppress ay disappearance of the symbol D due to the lowering in the line width of the symbol D, as depicted in FIG. 5B. Furthermore, by comparing the delete pattern and exclusion pattern with the dot patterns F and G, respectively, it is possible to suppress the comparison data regarding the dot patterns F and G, thereby making it possible to shorten the processing time.

First Modification

In a printing apparatus 10 according to a first modification, the delete pattern includes a M dot delete pattern of extracting, with respect to the image in which a plurality of pieces of the dot are continuously arranged side by side in a predetermined direction, dot data corresponding to M piece (M being an integer which is not less than 1 (one) and which is different from the N) of the dot which is to be deleted from the contour of the image. At least one of the plurality of exclusion patterns corresponding to the N dot delete pattern and a plurality of exclusion patterns corresponding to the M dot delete pattern includes an exclusion pattern formed of a dot pattern which is different from dot pattern forming the other of the plurality of exclusion patterns corresponding to the N dot delete pattern and the plurality of exclusion patterns corresponding to the M dot delete pattern.

For example, an extent by which the liquid bleeds easily on the medium A is different depending on the kind of the medium A. Accordingly, it is allowable to change the number of the dot(s) to be deleted from the contour of the image, depending on the kind of the medium A. In such a case, the controller 40 may obtain medium data.

The medium data is data indicating the extent by which the liquid easily bleeds on a medium A on which the image is to be printed, and is, for example, the kind of paper sheet (paper). In a case that the recording apparatus 10 has an input device 15 such as a keyboard, a mouse, etc., the medium data may be data inputted via the input device 15 by an user. Alternatively, the print data may include the medium data in addition to the image data.

The controller 40 sets the delete pattern based on the medium data. The medium data and the M dot delete pattern are associated with each other in advance and are stored in the memory 42. Here, as the liquid is more likely to bleed on a certain medium A, the number "M" of the dot to be deleted is set to be greater for the certain medium A. Note that in a case that the liquid is less likely to bleed on a medium A and that the medium data matches a predetermined condition, the controller 40 may execute the obtaining process and the printing process, without executing the determining process and the correcting process.

For example, in a case that the controller 40 extracts the dot data of one dot to be deleted from the contour of the image, one dot delete patterns of Examples 1 and 3 of FIG. 6 are stored in the memory 42. In this case, the dot data of one dot is extracted so as to delete one dot from each of the upper end and the left end of the contour of the image.

With respect to these one dot delete patterns, the exclusion patterns of Examples 1 and 2 of FIG. 7 are set. In such a manner, the exclusion patterns with respect to a two dot delete pattern are different from the exclusion patterns with respect to the one dot delete pattern, and include the exclusion patterns of Examples 3 and 4 of FIG. 7.

Figure 9:
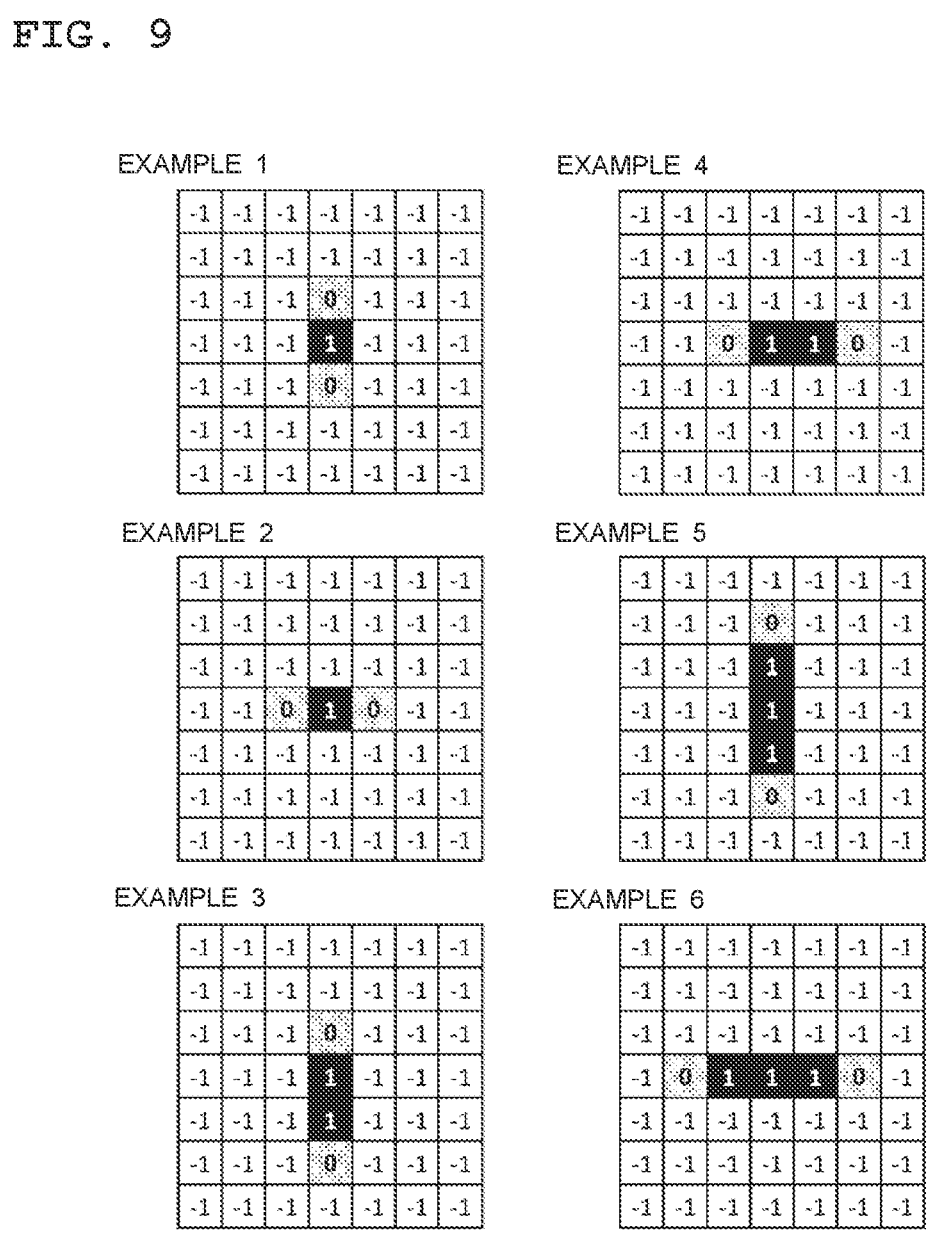

Further, for example, in a three dot delete pattern, the delete pattern is set so as to delete two dots from the upper end and one dot from the lower end of the contour of the image, and to delete two dot form the left end and one dot from the right end of the contour of the image. With respect to this three dot delete pattern, exclusion patterns of Examples 1 to 6 of FIG. 9 are set to extract dot data corresponding to not more than three dots continuously arranged in a predetermined direction. In such a manner, the exclusion patterns with respect to the three dot delete pattern are different from the exclusion patterns with respect to the two dot delete pattern, and include the exclusion patterns of Examples 5 and 6 of FIG. 9.

Figure 10:
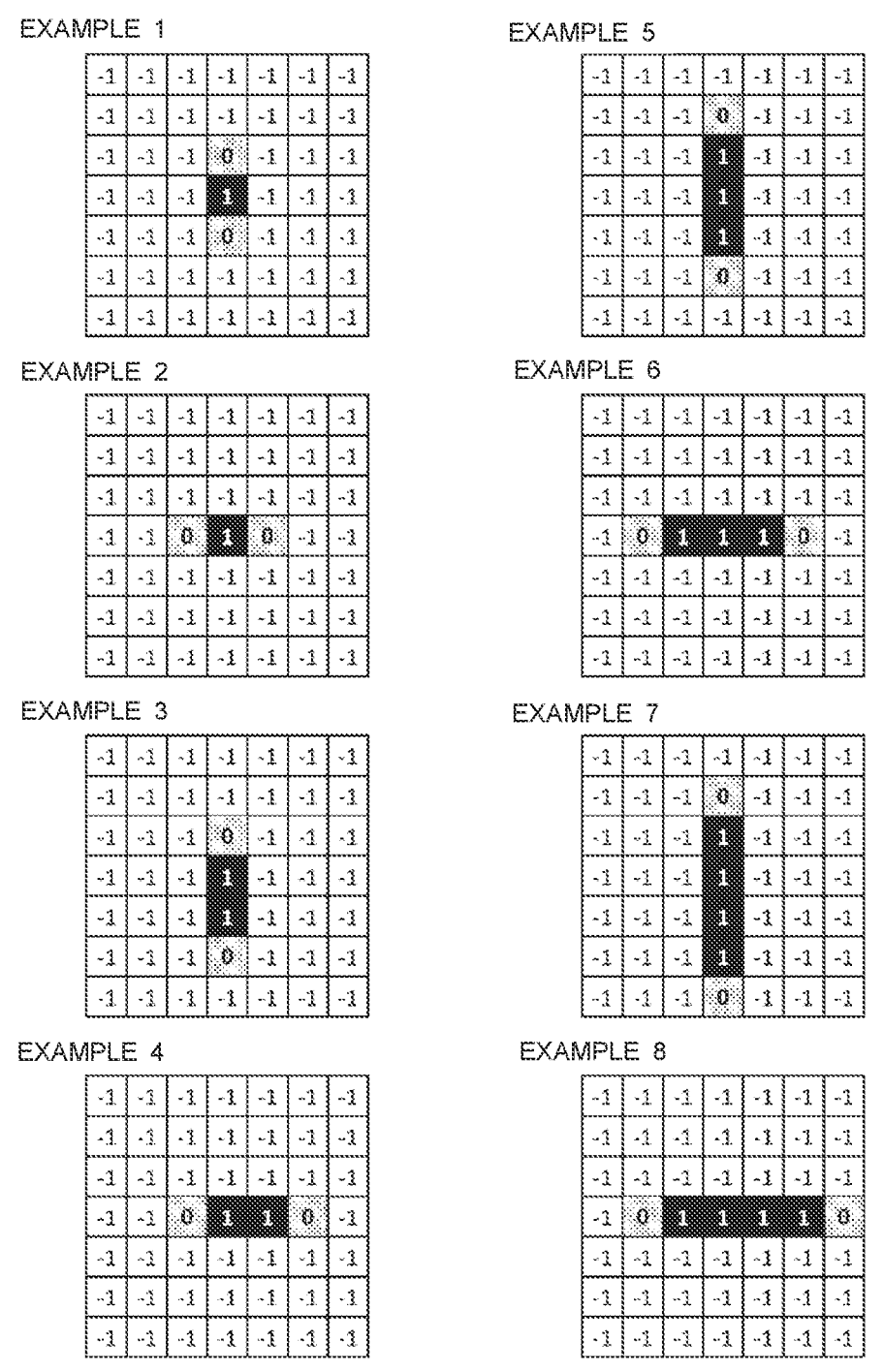

Furthermore, for example, in a four dot delete pattern, the delete pattern is set so as to delete two dots from the upper end and two dots from the lower end of the contour of the image, and to delete two dot form the left end and two dots from the right end of the contour of the image. With respect to this four dot delete pattern, exclusion patterns of Examples 1 to 8 of FIG. 10 are set to extract dot data corresponding to not more than four dots continuously arranged in a predetermined direction. In such a manner, the exclusion patterns with respect to the four dot delete pattern are different from the exclusion patterns with respect to the three dot delete pattern, and include the exclusion patterns of Examples 7 and 8 of FIG. 10.

Since the delete pattern and the exclusion pattern are set depending on the extent by which the liquid bleeds easily on the medium A, it is thereby possible to correct the print data more appropriately, and to easily suppress any lowering in the reading accuracy of the code and any disappearance of the symbol. Note that the kind of the delete pattern may be set based on information which is different from the medium data and which is inputted to the input device 15 by the user.

Second Modification

Figure 11:
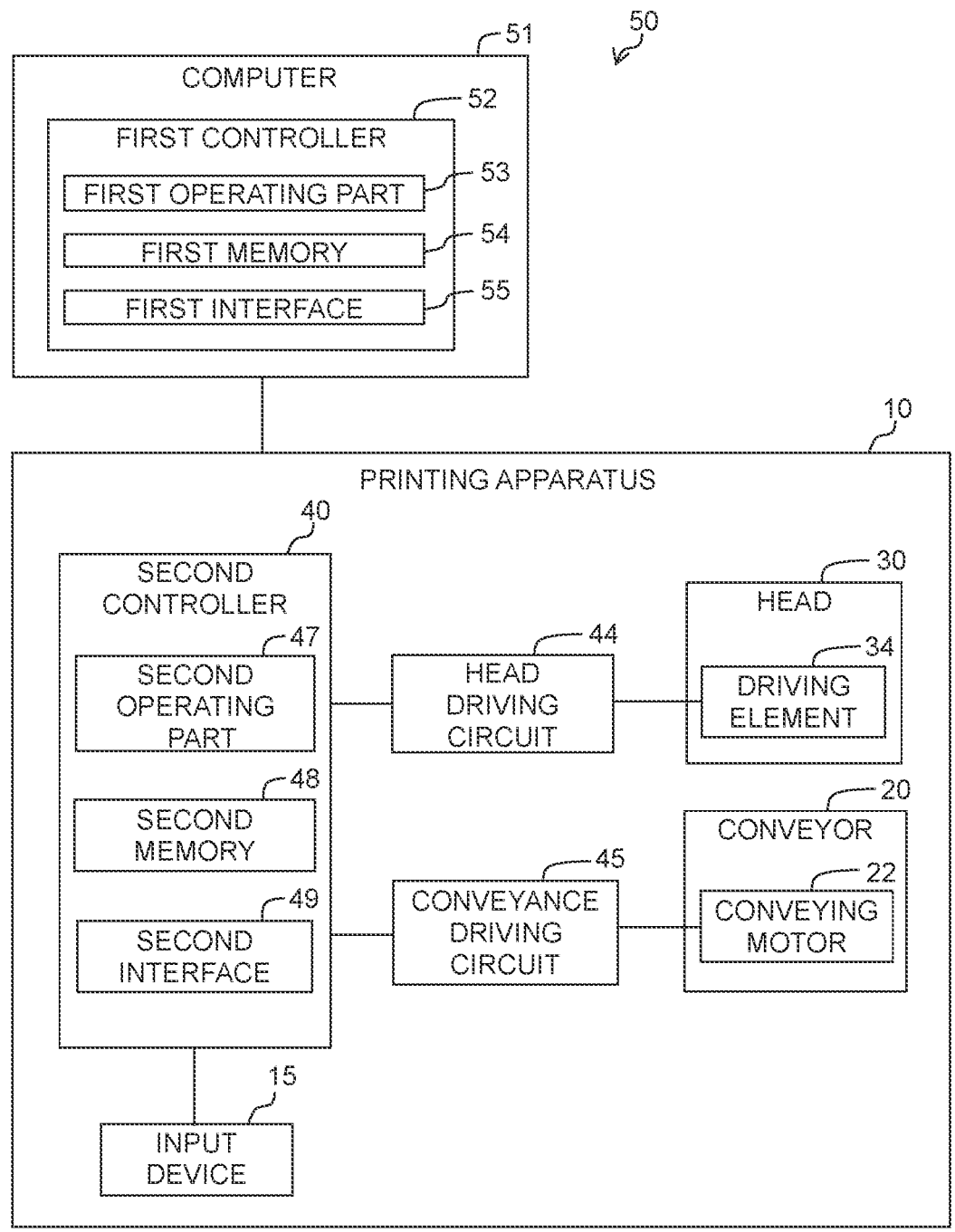
FIG. 11 is a functional block diagram depicting an example of a printing system according to an embodiment of the present disclosure.

A printing system 50 according to a second modification is provided with a computer 51 and a printing apparatus 10, as depicted in FIG. 11. The computer 51 has a first controller 52. The printing apparatus 10 has a head 30 which discharges a liquid onto a medium A, and a second controller 46. The first controller 52 obtains print data for forming an image including a code having information on the medium A, with a dot formed by making a liquid to land on the medium A. The first controller 52 selects, in the obtained print data, dot data corresponding to the dot forming the image, and determines whether or not a dot pattern F in a predetermined range including the selected dot data (hereinafter referred to as "selected dot data E") matches a predetermined delete pattern, and whether or not a dot pattern G in a predetermined range including the selected dot data E matches a predetermined exclusion pattern. The first controller 52 does not make a correction of deleting, from the print data, the selected dot data E regarding which the determination has been made as not matching at least the delete pattern. Further, the first controller 52 does not make the correction of deleting, from the print data, the selected dot data E regarding which the determination has been made as matching the delete pattern and the determination has been made as matching the exclusion pattern. Furthermore, the first controller 52 makes the correction of deleting, from the print data, the selected dot data E regarding which the determination has been made as matching the delete pattern and the determination has been made as not matching the exclusion pattern. The second controller 46 discharges, based on the corrected print data, the liquid(s) form the head(s) 30 onto the medium A to thereby form the image on the medium A.

For example, the first controller 52 has a first operating part 53, a first memory 54 and a first interface 55. Note that the first controller 52 may be a single first controller 52 which singly performs the control, or a plurality of first controllers 52 which perform the control in a decentralized manner.

The first interface 55 is connected to the printing apparatus 10, and transmits a variety of kids of data such as the print data, etc., to the printing apparatus 10. Further, the first memory 54 is a storage medium to which the first operating part 53 is accessible, and is constructed, for example, of a RAM and a ROM. The RAM temporarily stores a variety kinds of data. The ROM stores a program for performing a variety of kinds of process.

The first operating part 53 is constructed of a processor such as a CPU, etc., and an integrated circuit such as an ASIC, etc. The first operating part 53 executes the program stored in the ROM so as to execute the variety of kinds of process such as the obtaining process, the determining process, the correcting process, etc., in a similar manner as the operating part 41, and transmits the corrected print data to the printing apparatus 10 by the first interface 55.

Note that the print data may be data stored in the first memory 54. Alternatively, the print data may be data obtained by the first interface 55 from an external apparatus such as a network, a storage medium, etc. Still alternatively, in a case that the computer 51 has an input device such as a keyboard, a mouse, etc., the print data may be data inputted from the input device. Further, the print data may be binary or more data indicating whether or not the liquid is to be discharged from the head 30. Furthermore, the print data may be RGB value data before being converted to the binary or more data.

The second controller 46 has a second operating part 47, a second memory 48 and a second interface 49. The second interface 49 receives the print data corrected by the computer 51 from the first controller 52. The second operating part 47 executes a program stored in the second memory 48 to thereby execute the printing process based on the corrected print data. Except for those described above, the second controller 46, the second operating part 47, the second memory 48 and the second interface 49 are similar to the controller 40, the operating part 41, the memory 42 and the interface 43 of FIG. 3.

In the printing system 50, the first controller 52 executes the obtaining process, the determining process and the correcting process, and the second controller 46 executes the printing process. With this, it is possible to easily suppress any lowering in the reading accuracy of the information code C and any disappearance of the symbol D.

Other Modifications

In all of the embodiment and modifications as described above, the selected dot data E is deleted from the print data by replacing "1" of the selected dot data E, regarding which the determination has been made as matching the delete pattern and the determination has been made as not matching the exclusion pattern, with "0" of the blank data. Note that the method of deleting the selected dot data E is not limited to this. The second part C2 is not limited to being the blank part. It is allowable that a dot by the landing of the liquid may be formed also in the second part C2 under a condition that the first part C1 and the second part C2 are distinguishable from each other by the code reader, and that the information included in the information code C is readable.

For example, the first part C1 is printed with a black liquid, and the second part C2 is printed with a yellow liquid. In this case, the print data has color data for each of areas (regions) such as cells, in addition to density data per unit area of the image. It is allowable to delete the selected dot data E from the print data by replacing the black color of the selected dot data E, regarding which the determination has been made as matching the delete pattern and the determination has been made as not matching the exclusion pattern, with the yellow color.

Figure 12:
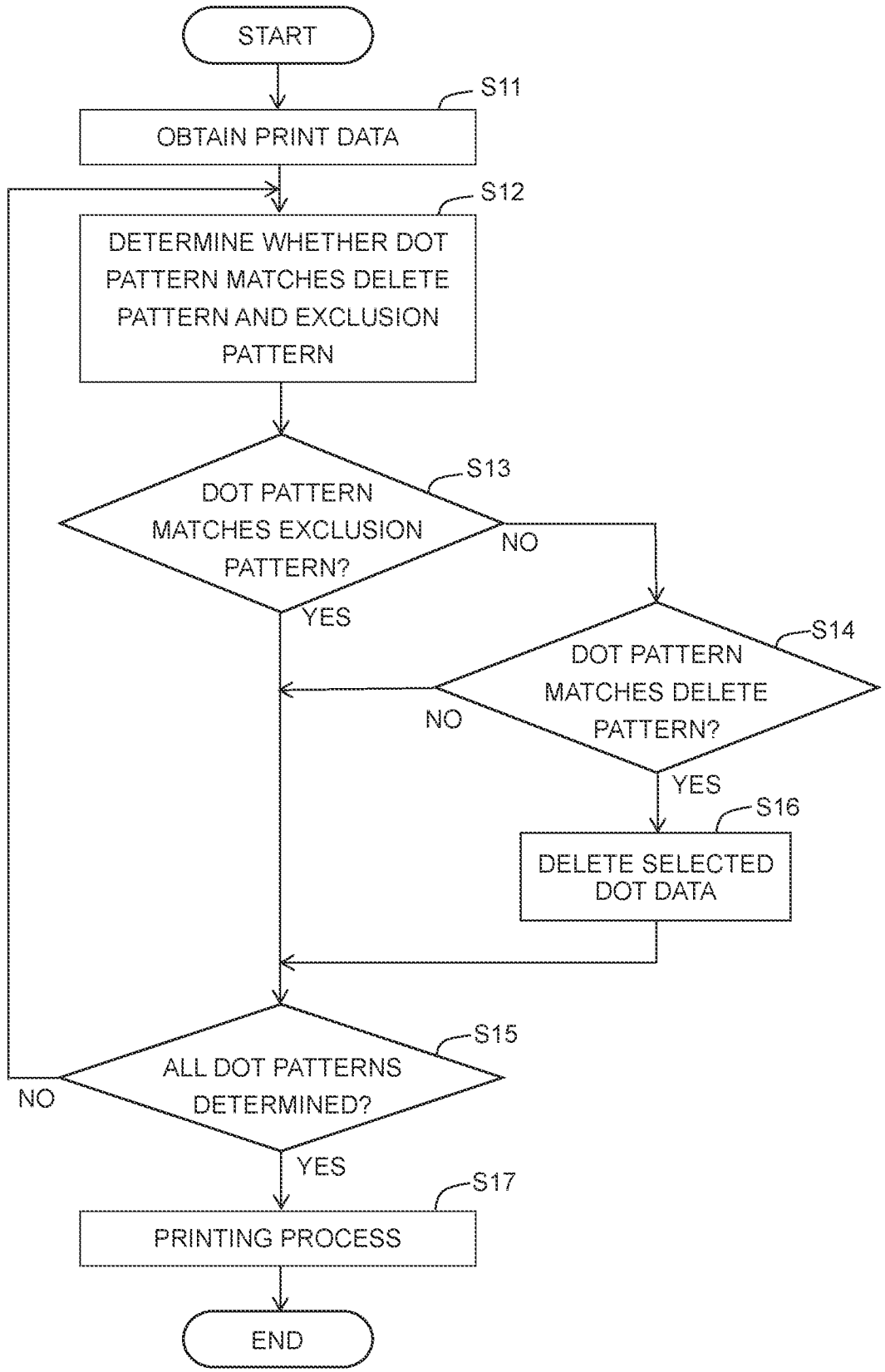
FIG. 12 is a flow chart indicating another example of the printing method according to the embodiment of the present disclosure.

In all of the embodiment and modifications as described above, it is allowable that the controller performs the correction by comparing the dot pattern with the delete pattern and the exclusion pattern and by deleting, from the print data, the selected dot data regarding which the determination has been made as matching the delete pattern and the determination has been made as not matching the exclusion pattern, but not by deleting, from the print data, the selected dot data different from the above-described selected dot data. Accordingly, for example, the controller executes the printing method along a flow chart depicted in FIG. 12. The process of steps S11 and S12 and the process of steps S15 to S17 in FIG. 12 are similar to those in steps S1 and S2 and those in steps S5 to S7 in FIG. 8.

In this case, the controller executes an obtaining process of obtaining the print data from the external apparatus B, etc., (step S11), and executes a determining process of determining whether or not the dot pattern F matches the delete pattern and whether or not and the dot pattern G matches the exclusion pattern (step S12). Further, in a case that the dot pattern G does not match the exclusion pattern (step S13: NO) and that the dot pattern F matches the delete pattern (step S14: YES), the controller performs a correction of deleting the selected dot data E from the print data (step S16). On the other hand, in a case that the dot pattern G matches the exclusion pattern (step S13: YES), and in a case that the dot pattern G does not match the exclusion pattern (step S13: NO) and that the dot pattern F does not match the delete pattern (step S14: NO), the controller does not perform the correction of deleting the selected dot data E from the print data. Further, in a case that the controller performs the determining process with respect all the dot patterns F and G in the print data (step S15: YES), the controller performs a printing process based on the corrected print data (step S17).

In all of the embodiment and modifications as described above, the medium A is a medium on which the liquid landed thereon from the head 30 easily bleeds, and is, for example, a paper sheet (paper). The paper sheet is exemplified by a cut paper sheet, a roll paper sheet, a label paper sheet, etc.

In all of the embodiment and modifications as described above, the line head system in which the heads 30 are fixed is used in the printing apparatus 10. It is allowable, however, that the printing apparatus 10 is provided with a carriage having the heads 30 mounted therein, and that a serial head system in which the heads 30 are moved in the left-right direction by the carriage is used in the printing apparatus 10. Alternatively, it is allowable that the printing apparatus 10 is not provided with the conveyor 20, and that a system in which the medium A is not conveyed and that the heads 30 are moved relative to the medium A is used in the printing apparatus 10.

Note that the above-described embodiment and respective modifications may be combined with each other as long as the embodiment and respective modifications are not mutually exclusive. Further, from the above-described explanation, numerous improvements and/or other embodiments of the present disclosure will be apparent to those skilled in the art. Accordingly, the foregoing explanation should be interpreted only as a mere example, and as being provided for the purpose of providing, to those skilled in the art, the best mode for carrying out the present disclosure. The configuration and/or the detailed function of the present disclosure may be substantially changed, without departing from the spirit of the present disclosure.

What is claimed is:

1. A printing apparatus comprising:
 a head configured to discharge liquid to a medium; and
 a controller,
 wherein the controller is configured to:
   obtain print data for forming an image on the medium with a dot which is formed by making the liquid to land on the medium, the image including a code having information;
   select, in the obtained print data, dot data corresponding to the dot forming the image as selected dot data, determine whether a first dot pattern including the selected dot data matches a predetermined delete pattern, and determine whether a second dot pattern including the selected dot data matches a predetermined exclusion pattern;
   perform a correction of the print data based on results of the determinations; and
   discharge the liquid from the head to the medium, based on the print data after the correction, to form the image on the medium,
 in the correction, the controller is configured to:
   maintain the selected dot data in the print data, in a case of determining that at least the first dot pattern does not match the delete pattern;
   maintain the selected dot data in the print data, in a case of determining that the first dot pattern matches the delete pattern and the second dot pattern matches the exclusion pattern; and
   delete the selected dot data from the print data, in a case of determining that the first dot pattern matches the delete pattern and the second dot pattern does not match the exclusion pattern.

2. The printing apparatus according to claim 1, wherein the delete pattern includes a dot pattern for extracting dot data corresponding to a dot constructing a contour of the image,
 the exclusion pattern includes a dot pattern for extracting dot data corresponding to dots constructing a line, and
 in a case that the dot data which matches the delete pattern is deleted from the print data, the dot data corresponding to the dots constructing the line is deleted by not less than a predetermined ratio.

3. The printing apparatus according to claim 1, wherein with respect to the image in which a plurality of pieces of the dot are continuously arranged in a predetermined direction, the delete pattern includes a N dot delete pattern for extracting dot data corresponding to N piece (N being an integer of not less than 1) of the dot which is to be deleted from the contour of the image, and
 a plurality of pieces of the exclusion pattern are provided with respect to the N dot delete pattern.

4. The printing apparatus according to claim 3, wherein with respect to the image in which the plurality of pieces of the dot are continuously arranged in the predetermined direction, the delete pattern includes a M dot delete pattern for extracting dot data corresponding to M piece (M being an integer of not less than 1 and different from N) of the dot which is to be deleted from the contour of the image, and
 in at least one of the plurality of pieces of the exclusion pattern corresponding to the N dot delete pattern and a plurality of pieces of the exclusion pattern corresponding to the M dot delete pattern, the exclusion pattern formed of a dot pattern which is different from a dot pattern forming the other of the plurality of pieces of the exclusion pattern corresponding to the N dot delete pattern and the plurality of pieces of the exclusion pattern corresponding to the M dot delete pattern.

5. The printing apparatus according to claim 3, wherein the plurality of pieces of the exclusion pattern corresponding to the N dot delete pattern include a dot pattern for extracting dot data corresponding to not more than N dots continuously arranged in the predetermined direction.

6. The printing apparatus according to claim 3, wherein in a case that the controller is set to use the N dot delete pattern as the delete pattern at a time of determining whether the first dot pattern matches the delete pattern and determining whether the second dot pattern matches the exclusion pattern, the controller is configured to delete less than N dots from the contour of the image with respect to at least a part of the image, at a time of deleting the selected dot data from the print data.

7. A printing system comprising:
   a computer; and
   a printing apparatus,
   wherein the computer has a first controller,
   the printing apparatus has a second controller and a head configured to discharge liquid to a medium,
   the first controller is configured to:
      obtain print data for forming an image on the medium with a dot which is formed by making the liquid to land on the medium, the image including a code having information;
      select, in the obtained print data, dot data corresponding to the dot forming the image as selected dot data, determine whether a first dot pattern including the selected dot data matches a predetermined delete pattern, and determine whether a second dot pattern including the selected dot data matches a predetermined exclusion pattern; and
      perform a correction of the print data based on results of the determinations,
   the second controller is configured to discharge the liquid from the head to the medium based on the corrected print data to form the image on the medium, and
   in the correction, the first controller is configured to:
      maintain the selected dot data in the print data, in a case of determining that at least the first dot pattern does not match the delete pattern;
      maintain the selected dot data in the print data, in a case of determining that the first dot pattern matches the delete pattern and the second dot pattern matches the exclusion pattern; and
      delete the selected dot data from the print data, in a case of determining that the first dot pattern matches the delete pattern and the second dot pattern does not match the exclusion pattern.

8. A printing method for a printing apparatus including a head configured to discharge liquid to a medium, and a controller, the printing method comprising:
   obtaining print data for forming an image on the medium with a dot which is formed by making the liquid to land on the medium, the image including a code having information;
   selecting, in the obtained print data, dot data corresponding to the dot forming the image as selected dot data, determining whether a first dot pattern including the selected dot data matches a predetermined delete pattern, and determining whether a second dot pattern including the selected dot data matches a predetermined exclusion pattern; and
   performing a correction of the print data based on results of the determinations; and
   discharging the liquid from the head to the medium, based on the corrected print data to form the image on the medium,
   wherein in the correction:
      the selected dot data is maintained in the print data, in a case of determining that at least the first dot pattern does not match the delete pattern;
      the selected dot data is maintained in the print data, in a case of determining that the first dot pattern matches the delete pattern and the second dot pattern matches the exclusion pattern; and
      the selected dot data is deleted from the print data, in a case of determining that the first dot pattern matches the delete pattern and the second dot pattern does not match the exclusion pattern.

* * * * *